US012175900B2

(12) United States Patent
Yoon et al.

(10) Patent No.: US 12,175,900 B2
(45) Date of Patent: Dec. 24, 2024

(54) DISPLAY DEVICE INCLUDING SENSING PIXEL ON DISPLAY PANEL AND TEMPERATURE SENSOR ON PRINTED CIRCUIT BOARD, AND DRIVING METHOD THEREOF

(71) Applicant: Samsung Display Co., Ltd., Yongin-Si (KR)

(72) Inventors: Hyun-Sik Yoon, Yongin-si (KR); Jongwoon Kim, Yongin-si (KR); Wonjin Seo, Yongin-si (KR); Kihyun Sung, Yongin-si (KR); Kihong Song, Yongin-si (KR); Yeseul Lee, Yongin-si (KR); Daeho Hwang, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 18/132,967

(22) Filed: Apr. 11, 2023

(65) Prior Publication Data

US 2023/0419871 A1 Dec. 28, 2023

(30) Foreign Application Priority Data

Jun. 28, 2022 (KR) ........................ 10-2022-0078865

(51) Int. Cl.
*G09G 3/00* (2006.01)
*G09G 3/3233* (2016.01)

(52) U.S. Cl.
CPC ........... *G09G 3/006* (2013.01); *G09G 3/3233* (2013.01); *G09G 2330/045* (2013.01); *G09G 2330/12* (2013.01)

(58) Field of Classification Search
None
See application file for complete search history.

(56) References Cited

U.S. PATENT DOCUMENTS

| | | | | |
|---|---|---|---|---|
| 8,142,042 | B2 | 3/2012 | Shibata et al. | |
| 2021/0202660 | A1* | 7/2021 | Hong | H05K 1/18 |
| 2021/0390892 | A1* | 12/2021 | Lee | G09G 3/035 |
| 2022/0189381 | A1* | 6/2022 | Hunt | G09G 5/10 |
| 2022/0215802 | A1* | 7/2022 | Moriya | G09G 3/3233 |
| 2023/0206837 | A1* | 6/2023 | Heo | G09G 3/3225 345/214 |

FOREIGN PATENT DOCUMENTS

| | | | |
|---|---|---|---|
| CN | 113192451 | A | 7/2021 |
| KR | 10-2009-0098676 | A | 9/2009 |
| KR | 10-2018-0002099 | A | 1/2018 |

* cited by examiner

*Primary Examiner* — Amare Mengistu
*Assistant Examiner* — Sarvesh J Nadkarni
(74) *Attorney, Agent, or Firm* — Innovation Counsel LLP

(57) ABSTRACT

A display device is disclosed that includes a display panel including a plurality of pixels, a printed circuit board connected to the display panel, a temperature sensor disposed on the printed circuit board, a flexible circuit board that connects the display panel to the printed circuit board, a data driver disposed on the flexible circuit board, and a temperature sensing part disposed on the printed circuit board. The flexible circuit board is bent such that the printed circuit board is disposed under the display panel and the temperature sensor is disposed adjacent to a sensing pixel outputting a sensing current among the pixels.

9 Claims, 10 Drawing Sheets

DISPLAY DEVICE INCLUDING SENSING PIXEL ON DISPLAY PANEL AND TEMPERATURE SENSOR ON PRINTED CIRCUIT BOARD, AND DRIVING METHOD THEREOF

CROSS-REFERENCE TO RELATED APPLICATIONS

This application claims priority under 35 U.S.C. § 119 to Korean Patent Application No. 10-2022-0078865 filed on Jun. 28, 2022, in the Korean Intellectual Property Office, the disclosures of which are incorporated by reference herein in their entireties.

BACKGROUND

The present disclosure described relates to a display device and a driving method thereof.

In general, electronic devices such as smart phones, digital cameras, notebook computers, navigation systems, smart televisions, and the like that provide images to users include display devices for displaying images. The display device generates an image and then provides the user with the generated image through a display screen.

The display device includes a plurality of pixels for generating an image, a scan driver for applying scan signals to the pixels, a data driver for applying data voltages to the pixels, and a voltage generator for applying an operating voltage to the pixels. The pixels may receive the data voltages in response to the scan signals, and then may generate an image by using the data voltages and the operating voltage.

The pixels include transistors and light emitting devices connected to the transistors. The transistors and the light emitting devices are affected by a temperature of the display panel. The lifetime of the transistors and the light emitting devices may vary depending on the temperature. Therefore, techniques for measuring the temperature of the display panel are desirable.

SUMMARY

Embodiments of the present disclosure provide a display device capable of determining whether a reference temperature value set to measure a temperature of a display panel is normal, and a driving method thereof.

According to an embodiment of the present disclosure, a display device includes a display panel including a plurality of pixels, a printed circuit board connected to the display panel, a temperature sensor disposed on the printed circuit board, a flexible circuit board that connects the display panel to the printed circuit board, a data driver disposed on the flexible circuit board, and a temperature sensing part disposed on the printed circuit board, wherein the flexible circuit board is bent such that the printed circuit board is disposed under the display panel and the temperature sensor is disposed adjacent to a sensing pixel configured to output a sensing current among the pixels.

According to an embodiment of the present disclosure, a method of driving a display device includes storing a reference temperature value calculated by a first sensing current value sensed from a sensing pixel of a display panel when the display panel is driven in a black mode, and determining whether the reference temperature value is normal, wherein the determining whether the reference temperature value is normal includes determining whether the reference temperature value is normal by comparing a difference value between a temperature value measured by a temperature sensor adjacent to the sensing pixel and the reference temperature value with a threshold value when the display panel is driven in the black mode.

BRIEF DESCRIPTION OF THE FIGURES

The above and other features of the present disclosure will become apparent by describing in detail embodiments thereof with reference to the accompanying drawings.

DETAILED DESCRIPTION

Figure 1:
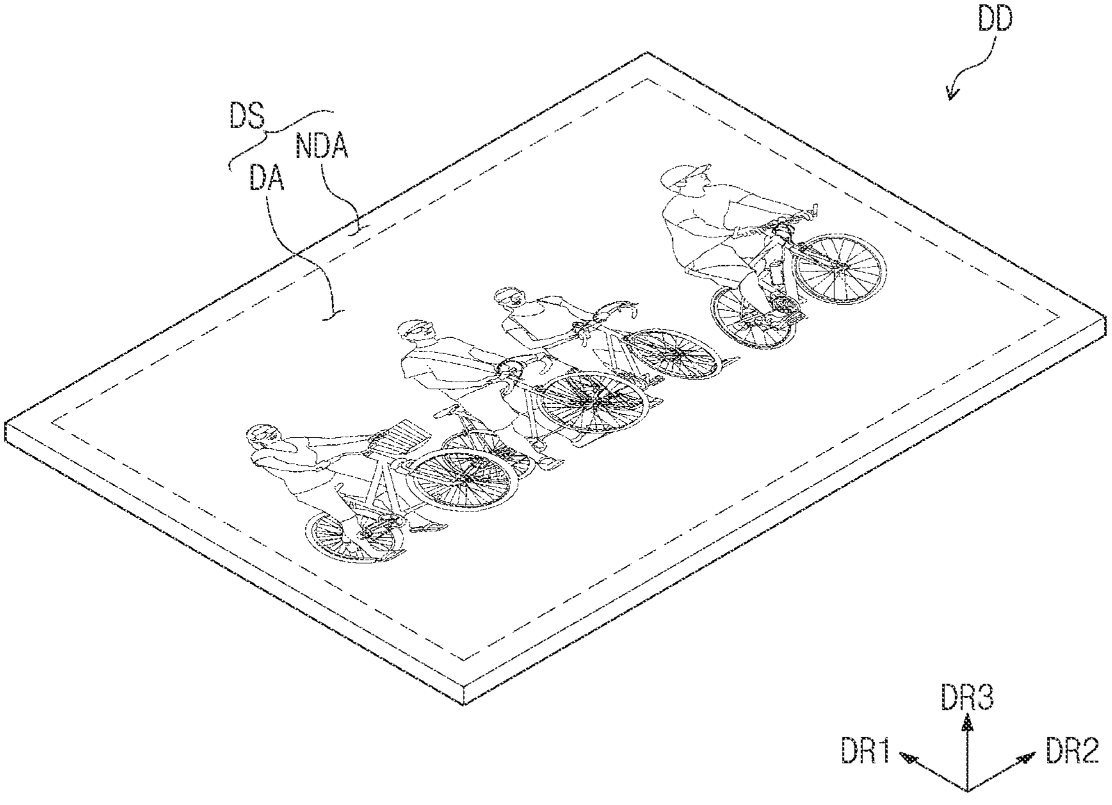
FIG. 1 is a perspective view of a display device according to an embodiment of the present disclosure.

In the specification, when one component (or area, layer, part, or the like) is referred to as being "on", "connected to", or "coupled to" another component, it should be understood that the former may be directly on, connected to, or coupled to the latter, and also may be on, connected to, or coupled to the latter via a third intervening component.

Like reference numerals refer to like components. Also, in drawings, the thickness, ratio, and dimension of components are exaggerated for effectiveness of description of technical contents.

As used herein, the word "or" means logical "or" so that, unless the context indicates otherwise, the expression "A, B, or C" means "A and B and C," "A and B but not C," "A and C but not B," "B and C but not A," "A but not B and not C," "B but not A and not C," and "C but not A and not B."

The terms "first", "second", etc. are used to describe various components, but the components are not limited by the terms. The terms are used only to differentiate one component from another component. For example, a first component may be named as a second component, and vice versa, without departing from the spirit or scope of the present disclosure. A singular form, unless otherwise stated, includes a plural form.

Also, the terms "under", "beneath", "on", "above" are used to describe a relationship between components illustrated in a drawing. The terms are relative and are described with reference to a direction indicated in the drawing.

Unless defined otherwise, all terms (including technical and scientific terms) used herein have the same meaning as commonly understood by one of ordinary skill in the art to which this disclosure belongs. In addition, terms such as terms defined in commonly used dictionaries should be interpreted as having a meaning consistent with the meaning in the context of the related technology, and should not be interpreted as an ideal or excessively formal meaning unless explicitly defined in the present disclosure.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Hereinafter, embodiments of the present disclosure will be described with reference to accompanying drawings.

FIG. 1 is a perspective view of a display device according to an embodiment of the present disclosure.

Referring to FIG. 1, a display device DD may have a plane defined by first and second directions DR1 and DR2. The display device DD may have a rectangular shape including short sides extending in the first direction DR1 and long sides extending in the second direction DR2. However, the present disclosure is not limited thereto, and the display device DD may have various shapes, such as a circular shape or a polygonal shape.

The upper surface of the display device DD may be defined as a display surface DS and may have a plane defined by the first direction DR1 and the second direction DR2. An image generated by the display device DD may be provided to a user through the display surface DS.

The display surface DS may include a display area DA and a non-display area NDA around the display area DA. The display area DA may display an image, and the non-display area NDA may not display an image. The non-display area NDA may surround the display area DA and may define a border of the display module DM, which is printed in a specified color.

The display device DD may be used in large electronic devices such as a television, a monitor, or an external billboard. In addition, the display device DD may be used in small and medium-sized electronic devices such as a personal computer, a notebook computer, a personal digital terminal, a car navigation system, a game console, a smart phone, a tablet, or a camera. However, these are presented as an embodiment only, and may be used in other electronic devices without departing from the concept of the present disclosure.

Figure 2:
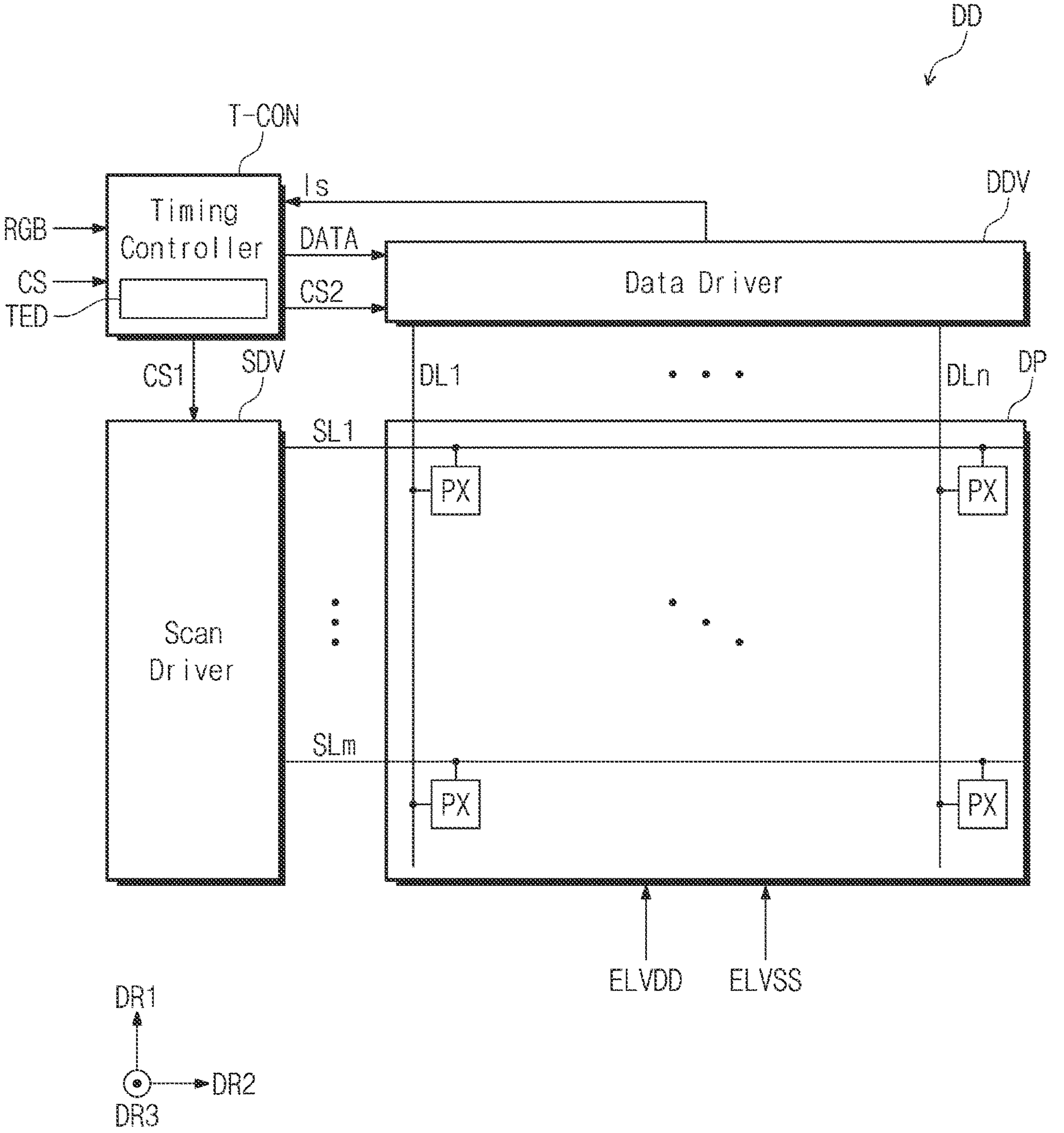
FIG. 2 is a block diagram of a display device illustrated in FIG. 1.

FIG. 2 is a block diagram of a display device illustrated in FIG. 1.

Referring to FIG. 2, the display device DD may include a display panel DP, a scan driver SDV, a data driver DDV, and a timing controller T-CON. The display panel DP may include a plurality of pixels PX, a plurality of scan lines SL1 to SLm, and a plurality of data lines DL1 to DLn. wherein, the 'm' and 'n' are natural numbers.

The scan lines SL1 to SLm may extend in the second direction DR2 to be connected to the pixels PX and the scan driver SDV. The data lines DL1 to DLn may extend in the first direction DR1 to be connected to the pixels PX and the data driver DDV.

A first voltage ELVDD and a second voltage ELVSS having a lower level than the first voltage ELVDD may be applied to the display panel DP. The first voltage ELVDD and the second voltage ELVSS may be applied to the pixels PX.

The timing controller T-CON may receive image signals RGB and a control signal CS from the outside (e.g., a system board). The timing controller T-CON may generate image data by converting the data format of the image signals RGB to match the interface specification with the data driver DDV. The timing controller T-CON may provide the image data of which data format are converted to the data driver DDV.

The timing controller T-CON may generate and output a first control signal CS1 and a second control signal CS2 in response to the control signal CS provided from the outside. The first control signal CS1 may be defined as a scan control signal, and the second control signal CS2 may be defined as a data control signal. The first control signal CS1 may be provided to the scan driver SDV, and the second control signal CS2 may be provided to the data driver DDV.

The scan driver SDV may generate a plurality of scan signals in response to the first control signal CS1. The scan signals may be applied to the pixels PX through the scan lines SL1 to SLm. The data driver DDV may generate a plurality of data voltages corresponding to the image data DATA in response to the second control signal CS2. The data voltages may be applied to the pixels PX through the data lines DL1 to DLn.

The pixels PX may receive the data voltages in response to the scan signals. The pixels PX may display images by emitting light of luminance corresponding to the data voltages.

The timing controller T-CON may receive a sensing current value 'Is' sensed in the display panel DP. For example, some of the pixels PX may be selected, and the sensing current value 'Is' sensed from the selected pixels may be provided to the timing controller T-CON. The sensing current value 'Is' may be provided to the timing controller T-CON through the data driver DDV.

The timing controller T-CON may include a temperature sensing part TED. The temperature sensing part TED may receive the sensing current value 'Is' and may calculate the temperature of the display panel DP using the sensing current value 'Is'. This configuration and operation will be described in detail below.

Figure 3:
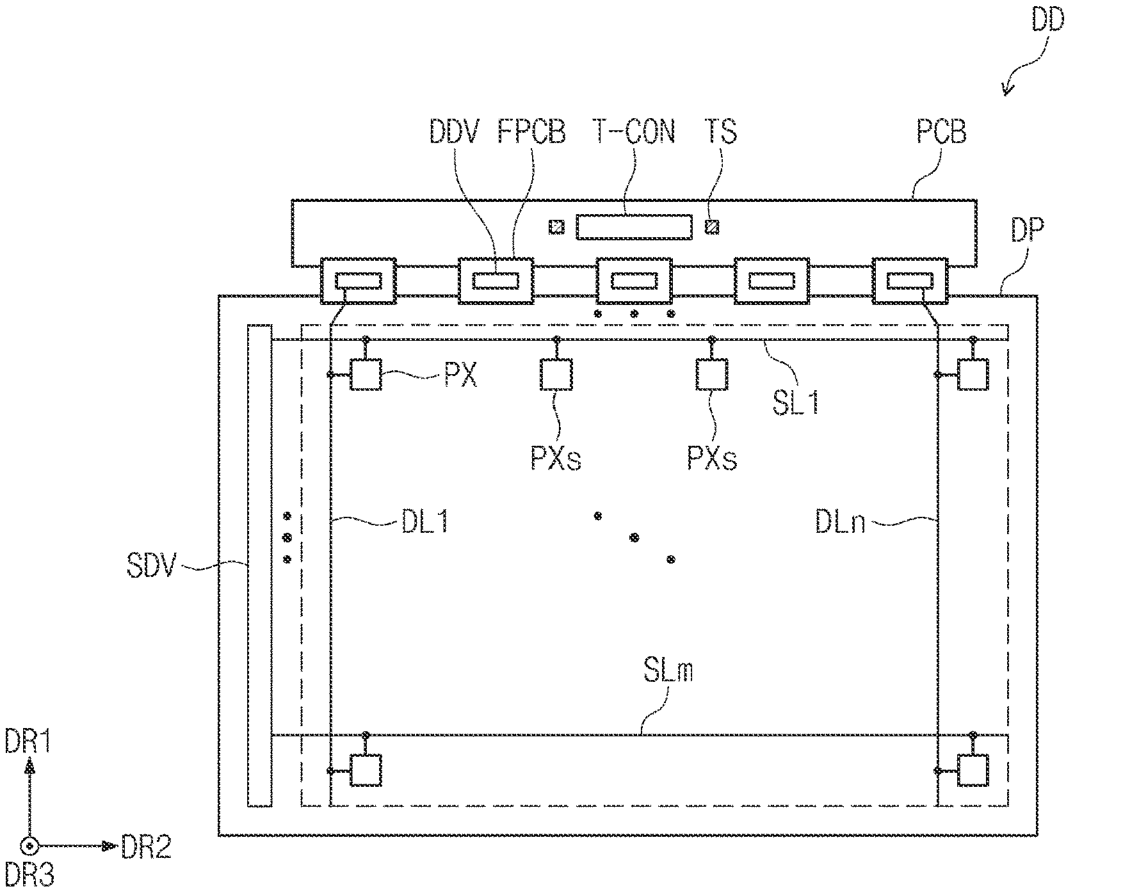
FIG. 3 is a plan view of a display panel illustrated in FIG. 2.

FIG. 3 is a plan view of a display panel illustrated in FIG. 2.

Hereinafter, the description overlapping with FIG. 2 in FIG. 3 will be omitted to avoid redundancy.

Referring to FIG. 3, the display device DD may include the display panel DP, the scan driver SDV, the data driver DDV, a plurality of flexible circuit boards FPCB, the timing controller T-CON, a printed circuit board PCB, and a plurality of temperature sensors TS.

The display panel DP may include the display area DA and the non-display area NDA surrounding the display area DA. The display panel DP may have a rectangular shape having long sides extending in the second direction DR2 and short sides extending in the first direction DR1, but the shape of the display panel DP is not limited thereto.

The display panel DP according to an embodiment of the present disclosure may be a light emitting display panel, and is not particularly limited thereto. For example, the display panel DP may be an organic light emitting display panel or an inorganic light emitting display panel. An emission layer of the organic light emitting display panel may include an organic light emitting material. An emission layer of the inorganic light emitting display panel may include quantum dots and quantum rods. Hereinafter, it is described that the display panel DP is an organic light emitting display panel.

The pixels PX may be disposed in the display area DA. The scan driver SDV may be disposed in the non-display area NDA adjacent to one of the short sides of the display panel DP. The plurality of data drivers DDV may be provided. The data drivers DDV may be disposed adjacent to an upper side of the display panel DP, which is defined as one of the long sides of the display panel DP.

The printed circuit boards PCB may be disposed adjacent to an upper side of the display panel DP. The printed circuit board PCB may be connected to the display panel DP through the flexible circuit boards FPCB. The flexible circuit boards FPCB may be connected to an upper side of the display panel DP and to the printed circuit boards PCB. The data drivers DDV may be manufactured in the form of an integrated circuit chip and may be mounted on the flexible circuit boards FPCB, respectively.

The data lines DL1 and DLn may extend to the flexible circuit boards FPCB and may be connected to the data drivers DDV. As an example, two data lines DL1 and DLn disposed on the leftmost and rightmost sides and connected to the data drivers DDV are illustrated, but in reality, a plurality of data lines may be connected in each of the data drivers DDV.

The timing controller T-CON may be manufactured in the form of an integrated circuit chip and may be mounted on the printed circuit board PCB. The temperature sensing part TED included in the timing controller T-CON may also be disposed on the printed circuit board PCB. The temperature sensors TS may be disposed on the printed circuit board PCB. The temperature sensors TS may sense the temperature of the display panel DP.

For example, although two temperature sensors TS are illustrated, the number of temperature sensors TS is not limited thereto, and at least one temperature sensor TS may be disposed on the printed circuit board PCB.

The pixels PX may include sensing pixels PXs. Some of the pixels PX may be selected as the sensing pixels PXs to output the above-described sensing current 'Is'. For example, two sensing pixels PXs are illustrated, but the number of sensing pixels PXs is not limited thereto, and at least one pixel PX may be selected as the sensing pixel PXs. The number of temperature sensors TS may be the same as the number of sensing pixels PXs.

Figure 4:
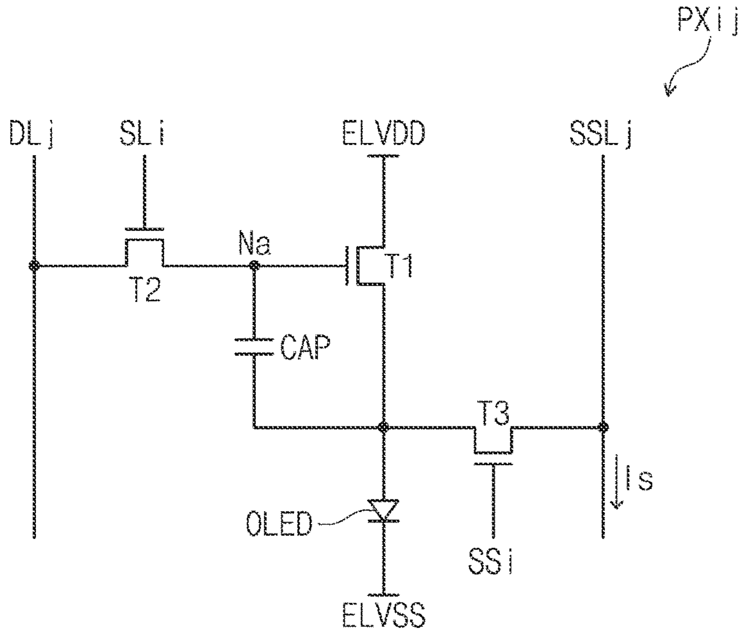
FIG. 4 illustrates an equivalent circuit of a pixel illustrated in FIG. 3.

FIG. 4 illustrates an equivalent circuit of a pixel illustrated in FIG. 3.

In FIG. 4, a pixel PXij connected to an i-th scan line SLi and a j-th data line DLj is illustrated as an example. wherein, the 'i' and 'j' are natural numbers.

Referring to FIG. 4, the pixel PXij may be connected to the i-th scan line SLi, the j-th data line DLj, an i-th sensing scan line SSi, and a j-th sensing line SSLj. The aforementioned scan lines SL1 to SLm may include the i-th scan line SLi and the i-th sensing scan line SSi illustrated in FIG. 4. The aforementioned data lines DL1 to DLn may include the j-th data line DLj and the j-th sensing line SSLj.

The pixel PXij may include a first transistor T1, a second transistor T2, a third transistor T3, a light emitting device OLED, and a capacitor CAP. The first transistor T1 may be defined as a driving transistor, the second transistor T2 may be defined as a switching transistor, and the third transistor T3 may be defined as a sensing transistor.

The first transistor T1 may include a first electrode receiving the first voltage ELVDD, a second electrode connected to an anode of the light emitting device OLED, and a control electrode connected to a first node Na. The first transistor T1 may control the amount of current flowing through the light emitting device OLED depending on a voltage value between a gate and a source of the first transistor T1.

The second transistor T2 may include a first electrode connected to the j-th data line DLj, a second electrode connected to the first node Na, and a control electrode connected to the i-th scan line SLi. The second transistor T2 may be turned-on by the scan signal applied from the i-th scan line SLi to supply the data voltage received from the j-th data line DLj to the capacitor CAP. The capacitor CAP may charge the data voltage.

The capacitor CAP may include a first electrode connected to the first node Na and a second electrode connected to the anode of the light emitting device OLED.

The third transistor T3 may include a first electrode connected to the j-th sensing line SSLj, a second electrode connected to the anode of the light emitting device OLED, and a control electrode connected to the i-th sensing scan line SSi.

To select the pixel PXij as the aforementioned sensing pixel PXs, the third transistor T3 may be turned on in response to a sensing signal applied through the i-th sensing scan line SSi. The third transistor T3 is turned-on, and the sensing current 'Is' flowing through the first transistor T1 may be output through the third transistor T3 and the j-th sensing line SSLj.

When the pixel PXij is selected as the sensing pixel PXs, the sensing current 'Is' may be output from the pixel PXij. The sensing current 'Is' may be provided to the temperature sensing part TED of the timing controller T-CON. The sensing current 'Is' may be defined as the sensing current value 'Is'.

The light emitting device OLED may include the anode connected to the second electrode of the first transistor T1 and a cathode receiving the second voltage ELVSS. The light emitting device OLED may generate light corresponding to the amount of current supplied from the first transistor T1.

Figure 5:
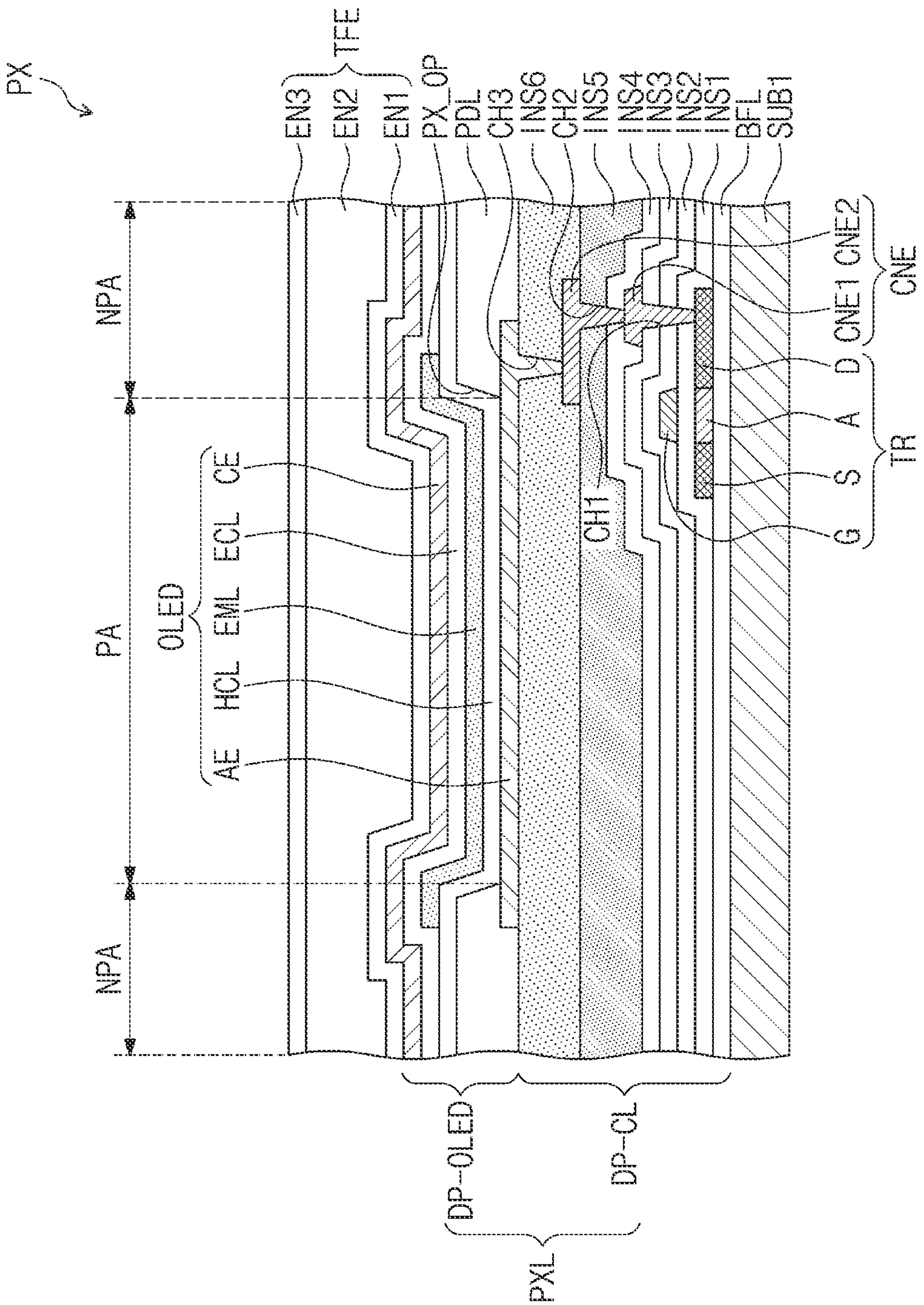
FIG. 5 illustrates a cross-section of any one pixel illustrated in FIG. 3 as an example.

FIG. 5 illustrates a cross-section of any one pixel illustrated in FIG. 3.

Referring to FIG. 5, the pixel PX may include a transistor TR and the light emitting device OLED. The transistor TR may be a first transistor T1 illustrated in FIG. 4. The light emitting device OLED may include a first electrode AE (or anode), a second electrode CE (or cathode), a hole control layer HCL, an electron control layer ECL, and an emission layer EML. The transistor TR and the light emitting device OLED may be disposed on a first substrate SUB1.

A planar area of each of the pixels PX may include an emission area PA and a non-emission area NPA around the emission area PA. The light emitting device OLED may be disposed in the emission area PA.

A buffer layer BFL may be disposed on the first substrate SUB1, and the buffer layer BFL may be an inorganic layer. A semiconductor pattern may be disposed on the buffer layer BFL. The semiconductor pattern may include polysilicon, amorphous silicon, or metal oxide.

The semiconductor pattern may be doped with an N-type dopant or a P-type dopant. The semiconductor pattern may include a highly dope area and a lightly doped area. Conductivity of the high doped area may be greater than that of the low doped area. The high doped area may operate as a source electrode or a drain electrode of the transistor TR. The lightly doped area may correspond to an active (or a channel) of the transistor TR.

A source S, an active region A, and a drain D of the transistor TR may be formed from a semiconductor pattern. A first insulating layer INS1 may be disposed on the semiconductor pattern. A gate G of the transistor TR may be disposed on the first insulating layer INS1. A second insulating layer INS2 may be disposed on the gate G. A third insulating layer INS3 may be disposed on the second insulating layer INS2.

A connection electrode CNE may connect the transistor TR and the light emitting device OLED. The connection electrode CNE may include a first connection electrode CNE1 and a second connection electrode CNE2. The first connection electrode CNE1 may be disposed on the third insulating layer INS3 and may be connected to the drain D through a first contact hole CH1 defined in the first to third insulating layers INS1 to INS3.

A fourth insulating layer INS4 may be disposed on the first connection electrode CNE1. A fifth insulating layer INS5 may be disposed on the fourth insulating layer INS4. The second connection electrode CNE2 may be disposed on the fifth insulating layer INS5. The second connection electrode CNE2 may be connected to the first connection electrode CNE1 through a second contact hole CH2 defined in the fourth and fifth insulating layers INS4 and INS5.

A sixth insulating layer INS6 may be disposed on the second connection electrode CNE2. Layers from the buffer layer BFL to the sixth insulating layer INS6 may be defined as a circuit device layer DP-CL. The first to sixth insulating layers INS1 to INS6 may be inorganic layers or organic layers.

The first electrode AE may be disposed on the sixth insulating layer INS6. The first electrode AE may be connected to the second connection electrode CNE2 through a third contact hole CH3 defined in the sixth insulating layer INS6. A pixel defining layer PDL in which an opening PX_OP for exposing a predetermined portion of the first electrode AE is defined may be disposed on the first electrode AE and the sixth insulating layer INS6.

The hole control layer HCL may be disposed on the first electrode AE and the pixel defining layer PDL. The hole control layer HCL may include a hole transport layer and a hole injection layer.

The emission layer EML may be disposed on the hole control layer HCL. The emission layer EML may be disposed in an area corresponding to the opening PX_OP. The emission layer EML may include an organic material or an inorganic material. The emission layer EML may generate blue light.

The electron control layer ECL may be disposed on the emission layer EML and the hole control layer HCL. The electron control layer ECL may include an electron transport layer and an electron injection layer. The hole control layer HCL and the electron control layer ECL may be disposed in common in the emission area PA and the non-emission area NPA.

The second electrode CE may be disposed on the electron control layer ECL. The second electrode CE may be disposed in the pixels PX in common. A layer in which the light emitting device OLED is disposed may be defined as a display device layer DP-OLED. The circuit device layer DP-CL and the display device layer DP-OLED may be defined as a pixel layer PXL.

The thin film encapsulation layer TFE may be disposed on the second electrode CE so as to cover the pixel PX. The thin film encapsulation layer TFE may include a first encapsulation layer EN1 disposed on the second electrode CE, a second encapsulation layer EN2 disposed on the first encapsulation layer EN1, and a third encapsulation layer EN3 disposed on the second encapsulation layer EN2. Each of the first and third encapsulation layers EN1 and EN3 may include an inorganic insulating layer, and may protect the pixel PX from moisture/oxygen. The second encapsulation layer EN2 may include an organic insulating layer and may protect the pixel PX from foreign objects such as dust particles.

The first voltage ELVDD may be applied to the first electrode AE through the transistor TR, and the second voltage ELVSS may be applied to the second electrode CE. Excitons may be formed by coupling holes and electrons injected into the emission layer EML. As the excitons transition to a ground state, the light emitting device OLED may emit light.

Figure 6:
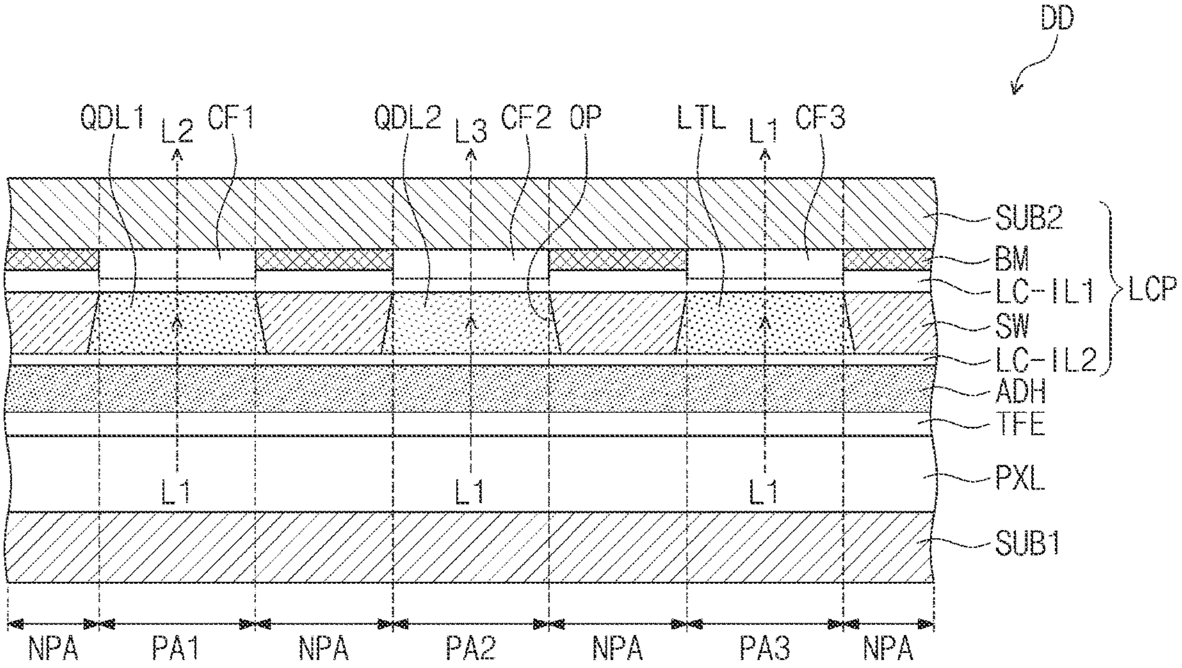
FIG. 6 illustrates a cross-section of a light conversion part disposed on a pixel layer illustrated in FIG. 5 as an example.

FIG. 6 illustrates a cross-section of a light conversion part disposed on a pixel layer shown in FIG. 5.

FIG. 6 illustrates first, second, and third emission areas PA1, PA2, and PA3 as an example. The emission area PA illustrated in FIG. 5 may be one of first, second, and third emission areas PA1, PA2, and PA3. In addition, for convenience of description, in FIG. 6, cross-sectional structures of the transistor TR and the light emitting device OLED illustrated in FIG. 5 are omitted, and the pixel layer PXL is illustrated as a single layer.

Referring to FIG. 6, the display device DD may include a light conversion part LCP disposed on the thin film encapsulation layer TFE. The light conversion part LCP may be attached on the thin film encapsulation layer TFE by an adhesive layer ADH.

Areas between the first, second, and third emission areas PA1, PA2, and PA3 may be defined as the non-emission area NPA. The first, second, and third emission areas PA1, PA2, and PA3 may generate first light L1. Herein, the first light L1 may be blue light.

The light conversion part LCP may include a second substrate SUB2, first and second quantum dot layers QDL1 and QDL2), a light transmitting layer LTL, first, second, and third color filters CF1, CF2, and CF3, a black matrix BM, a side wall layer SW, and first and second insulating layers LC-IL1 and LC-IL2. The first and second quantum dot layers QDL1 and QDL2, the light transmitting layer LTL, the first, second, and third color filters CF1, CF2, and CF3, the black matrix BM, and the side wall layer SW may be interposed between the second substrate SUB2 and the thin film encapsulation layer TFE.

The first, second, and third color filters CF1, CF2, and CF3 and the black matrix BM may be disposed under the second substrate SUB2. The first, second, and third color filters CF1, CF2, and CF3 may overlap the first, second, and third emission areas PA1, PA2, and PA3, respectively. The black matrix BM may overlap the non-emission area NPA.

The first color filter CF1 may overlap the first emission area PA1, the second color filter CF2 may overlap the second emission area PA2, and the third color filter CF3 may overlap the third emission area PA3. The first color filter CF1 may include a red color filter. The second color filter CF2 may include a green color filter. The third color filter CF3 may include a blue color filter.

The first insulating layer LC-IL1 may be disposed under the first, second, and third color filters CF1, CF2, and CF3 and the black matrix BM. The side wall layer SW may be disposed under the first insulating layer LC-IL1.

Openings OP for disposing the first and second quantum dot layers QDL1 and QDL2 and the light transmitting layer LTL may be defined by the side wall layer SW. The openings OP may overlap the first, second, and third emission areas PA1, PA2, and PA3. The side wall layer SW may overlap the non-emission area NPA. The side wall layer SW may have a black color, but the color of the side wall layer SW is not limited thereto.

The first and second quantum dot layers QDL1 and QDL2 and the light transmitting layer LTL may be disposed under the first insulating layer LC-IL1. The first and second quantum dot layers QDL1 and QDL2 and the light transmitting layer LTL may be disposed in the openings OP.

The first and second quantum dot layers QDL1 and QDL2 and the light transmitting layer LTL may overlap the first, second, and third emission areas PA1, PA2, and PA3, respectively. The first quantum dot layer QDL1 may overlap the first emission area PA1, the second quantum dot layer QDL2 may overlap the second emission area PA2, and the light transmitting layer LTL may overlap the third emission area PA3.

The first light L1 generated in the first, second, and third emission areas PA1, PA2, and PA3 may be provided to the first and second quantum dot layers QDL1 and QDL2 and the light transmitting layer LTL. The first light L1 generated in the first emission area PA1 may be provided to the first quantum dot layer QDL1, and the first light L1 generated in the second emission area PA2 may be provided to the second quantum dot layer QDL2. The first light L1 generated in the third emission area PA3 may be provided to the light transmitting layer LTL.

The first quantum dot layer QDL1 may convert the first light L1 into the second light L2. The second quantum dot layer QDL2 may convert the first light L1 into the third light L3. The second light L2 may be a red light, and the third light L3 may be a green light. The first quantum dot layer QDL1 may include first quantum dots (not illustrated), and the second quantum dot layer QDL2 may include second quantum dots (not illustrated). The light transmitting layer LTL may include light scattering particles (not illustrated) for scattering light.

The first quantum dots may convert the first light L1 having a blue wavelength band into the second light L2 having a red wavelength band. The second quantum dots may convert the first light L1 having a blue wavelength band into the third light L3 having a green wavelength band. The first and second quantum dots may scatter the second light L2 and the third light L3. The light transmitting layer LTL may transmit the first light L1 without performing a light conversion operation. The light transmitting layer LTL may emit light by scattering the first light L1 through the light scattering particles.

The first quantum dot layer QDL1 may emit the second light L2. The second quantum dot layer QDL2 may emit the third light L3. The light transmitting layer LTL may emit the first light L1. Accordingly, a predetermined image may be displayed by the second light L2, the third light L3, and the first light L1 that display red, green, and blue, respectively.

Without light conversion being performed by the first quantum dots, a part of the first light L1 may pass through the first quantum dot layer QDL1 and then may be provided to the first color filter CF1. That is, the first light L1 that is not converted into the second light L2 because the first light L1 is not in contact with the first quantum dots may be present. The first color filter CF1 may block light of other colors. The first light L1 that is not converted in the first quantum dot layer QDL1 may be blocked by the first color filter CF1 having a red color filter, and thus may not be emitted toward the upper layer.

Without light conversion being performed by the second quantum dots, a part of the first light L1 may pass through the second quantum dot layer QDL2 and then may be provided to the second color filter CF2. That is, the first light L1 that is not converted into the third light L3 because the first light L1 is not in contact with the second quantum dots may be present. The second color filter CF2 may block light of other colors. The first light L1 that is not converted in the second quantum dot layer QDL2 may be blocked by the second color filter CF2 having a green color filter, and thus may not be emitted toward the upper layer.

External light may be provided toward the display device DD. When the external light is reflected from the display panel DP and provided again to an external user, the user may visually perceive the external light, like a mirror.

The first, second, and third color filters CF1, CF2, and CF3 may prevent reflection of the external light. For example, the first, second, and third color filters CF1, CF2, and CF3 may filter the external light into red, green, and blue colors. That is, the first, second, and third color filters CF1, CF2, and CF3 may filter external light with the same color as the second light L2, the third light L3, or the first light L1. In this case, the external light may not be perceived by the user.

The black matrix BM may block unnecessary light in the non-emission area NPA. The side wall layer SW having black may also have a function similar to the black matrix BM, and may block unnecessary light in the non-emission area NPA.

Figure 7:
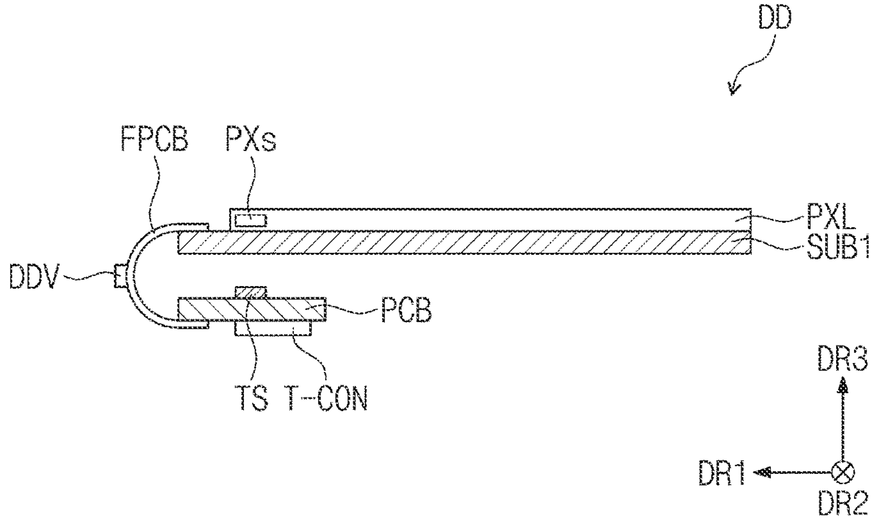
FIG. 7 is a side view of a display device illustrated in FIG. 3.

FIG. 7 is a side view of a display device illustrated in FIG. 3.

For example, the side surface of the display device DD viewed from the second direction DR2 is illustrated in FIG. 7, and the thin film encapsulation layer TFE and the light conversion part LCP described in FIG. 6 are omitted.

Referring to FIG. 7, the flexible circuit board FPCB may be bent such that the printed circuit board PCB may be disposed under the display panel DP. Accordingly, the timing controller T-CON and the temperature sensor TS may be disposed under the display panel DP.

The pixel layer PXL is disposed on the first substrate SUB1, and the pixel layer PXL may include sensing pixels PXs. The temperature sensor TS may be disposed adjacent to the sensing pixel PXs. The sensing pixels PXs may be disposed adjacent to one side of the display panel DP to which the flexible circuit board FPCB is connected. When viewed on a plane, the sensing pixels PXs may be disposed to overlap the temperature sensor TS.

The temperature sensor TS may be disposed adjacent to the display panel DP to sense the temperature of the display panel DP. For example, the temperature sensor TS may be disposed adjacent to the sensing pixel PXs to sense the temperature of a portion of the display panel DP where the sensing pixel PXs is disposed.

In the manufacturing process of the display device DD, the display panel DP may be driven in a black mode, and current may be sensed from the sensing pixel PXs of the display panel DP. An initial temperature value of the display panel DP may be determined using a current sensed from the sensing pixel PXs of the display panel DP driven in the black mode. The initial temperature value is stored in the temperature sensing part TED, and thereafter, when the display panel DP operates in the display mode, the initial temperature value may be used to sense the temperature of the display panel DP.

Hereinafter, when the display panel DP is driven in the black mode, the calculated initial temperature value is defined as a reference temperature value.

The temperature of the display panel DP sensed by the temperature sensor TS may be used to determine whether the reference temperature value is normal. Accordingly, the temperature sensor TS may be disposed adjacent to the sensing pixel PXs used to determine the reference temperature value. For example, to reduce an error between the temperature of the display panel DP sensed by the temperature sensor TS and the reference temperature value of the display panel DP calculated by the current sensed from the sensing pixel PXs, the temperature sensor TS may be disposed adjacent to the sensing pixel PXs.

Figure 8:
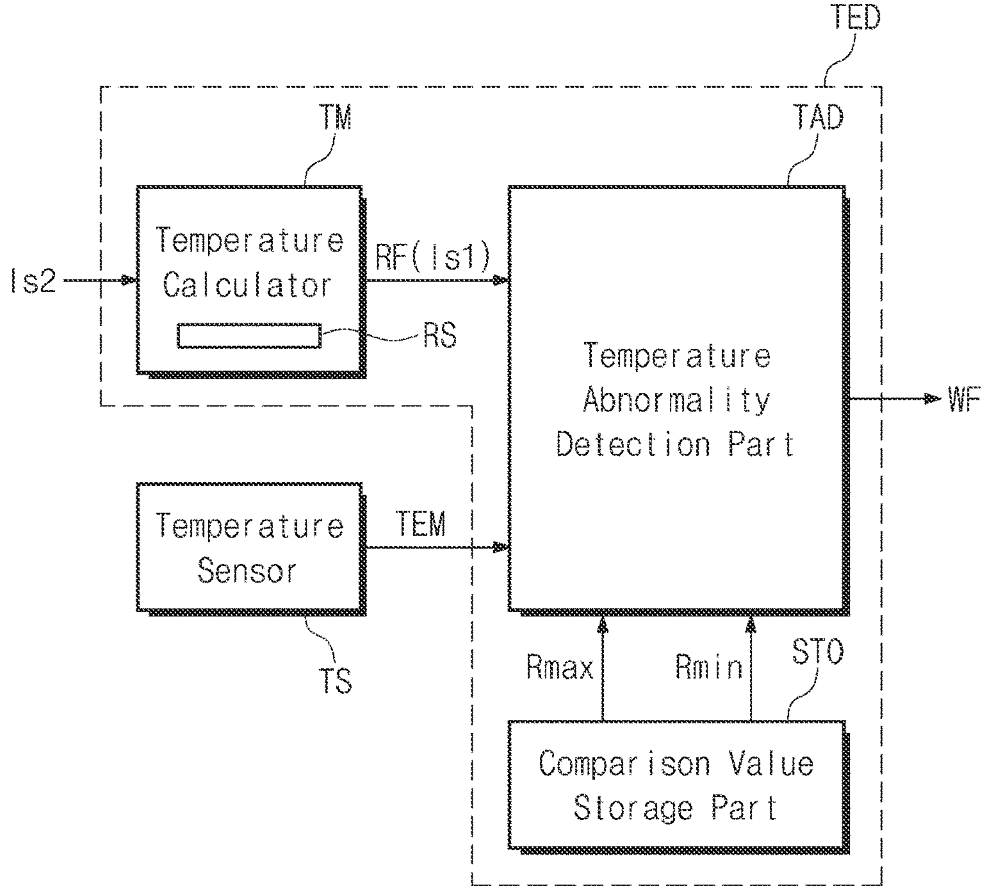
FIG. 8 is a block diagram of a temperature sensing part illustrated in FIG. 2.
Figure 9:
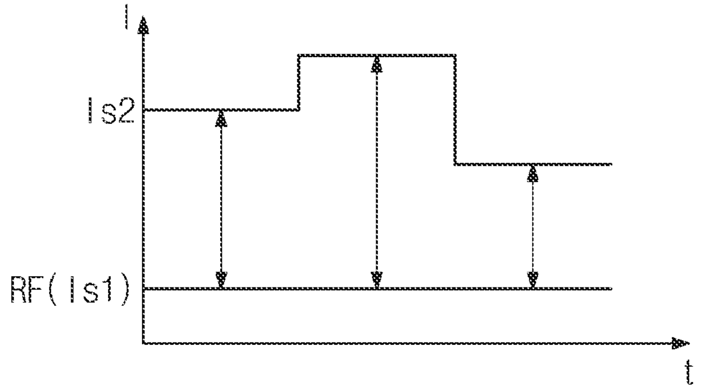
FIG. 9 is a time-current diagram for describing an operation of a temperature calculator illustrated in FIG. 8.
Figure 10:
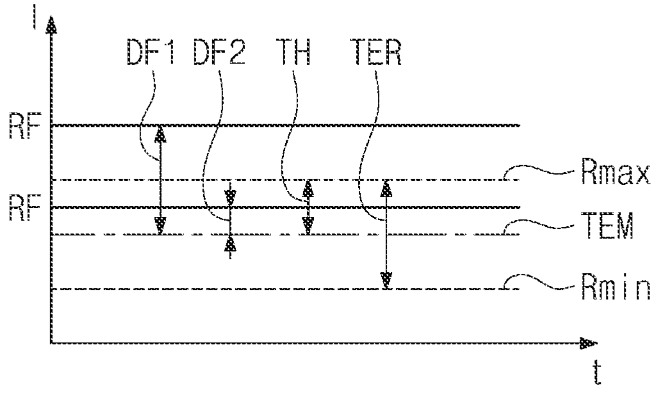
FIG. 10 is a time-current diagram illustrating a normal temperature range of a reference temperature value as an example.

FIG. 8 is a block diagram of a temperature sensing part illustrated in FIG. 2. FIG. 9 is a diagram for describing an operation of a temperature calculator illustrated in FIG. 8. FIG. 10 is a diagram illustrating a normal temperature range of a reference temperature value.

In FIGS. 9 and 10, a vertical axis may indicate a current value, and the horizontal axis may indicate time. The temperature of the display panel DP may be proportional to the current T, which is the vertical axis in FIGS. 9 and 10. Accordingly, the current T, which is the vertical axis, may correspond to the temperature.

Referring to FIG. 8, the temperature sensing part TED may include a temperature calculator TM, a temperature abnormality detection part TAD, and a comparison value storage part STO. The temperature calculator TM may include a reference value storage part RS.

In the manufacturing process of the display device DD, the display panel DP may be driven in the black mode. For example, the display panel DP may be driven to display black. When the display panel DP is driven in the black mode, the current value sensed from the sensing pixel PXs may be defined as the first sensing current value Is1.

The temperature of the display panel DP may be proportional to the amount of current. Accordingly, the temperature value of the display panel DP may be calculated using the first sensing current value Is1. According to the first sensing current value Is1, the calculated temperature of the display panel DP may be stored in the temperature calculator TM as a reference temperature value RF. The reference temperature value RF may be stored in the reference value storage part RS of the temperature calculator TM. The first sensing current value Is1 and the reference temperature value RF may be stored in the reference value storage part RS.

A maximum value Rmax and a minimum value Rmin of a predetermined temperature range may be stored in the comparison value storage part STO. The maximum value Rmax and the minimum value Rmin may be provided to the temperature abnormality detection part TAD.

The reference temperature value RF and the first sensing current value Is1 may be provided to the temperature abnormality detection part TAD. A temperature TEM (or temperature value) of the display panel DP measured by the temperature sensor TS may be provided to the temperature abnormality detection part TAD.

The temperature abnormality detection part TAD may determine whether the reference temperature value RF is normal using the reference temperature value RF, the first sensing current value Is1, the temperature value TEM, the maximum value Rmax, and the minimum value Rmin. This operation will be described in detail below. Referring to FIGS. 8 and 9, when the display panel DP is driven in the display mode, the current value sensed from the sensing pixel PXs may be defined as a second sensing current value Is2. The second sensing current value Is2 may be the sensing current value 'Is' described with reference to FIG. 2. The temperature of the display panel DP driven in the display mode may be calculated by using the second sensing current value Is2 and the first sensing current value Is1 corresponding to the reference temperature value RF.

Since it is difficult for the temperature sensor to be directly disposed on the display panel DP, the temperature of the display panel DP may be measured indirectly. As described above, the reference temperature value RF may correspond to the first sensing current value Is1. The difference value between the second sensing current value Is2 and the first sensing current value Is1 may be a value corresponding to a temperature change amount of the display panel DP based on the reference temperature value RF.

It may be interpreted that the temperature of the display panel DP is changed from the reference temperature value RF by the difference between the second sensing current value Is2 and the first sensing current value Is1. Accordingly, the temperature calculator TM may calculate the temperature of the display panel DP by using the difference value between the second sensing current value Is2 and the first sensing current value Is1. The temperature value of the display panel DP driven in the display mode may be calculated depending on the difference between the second sensing current value Is2 and the first sensing current value Is1.

The temperature value may be used in various peripheral circuits. For example, the calculated temperature value may be used for a protection part that shuts down the display panel DP by determining the overheating state of the display panel DP, depending on the temperature of the display panel DP.

When the display panel DP is driven in the black mode, the temperature value of the display panel DP is an initial temperature value, and when the display panel DP is driven in the display mode, the temperature of the display panel DP may increase. Accordingly, the second sensing current value Is2 may be greater than the first sensing current value Is1.

The reference temperature value RF may be, for example, measured by setting the periphery of the display panel DP to 24 degrees Celsius in a process stage. However, when an ambient temperature momentarily deviates from 24 degrees Celsius according to various environments, the reference temperature value RF may be erroneously calculated. Also, the reference temperature value RF may be incorrectly written as a different value in the reference value storage part RS. In this case, an error may occur with respect to the reference temperature value RF.

Referring to FIGS. 8 and 10, when the reference temperature value RF has a value within a preset error range TER, the display device DD may operate normally. When the reference temperature value RF has a value out of the preset error range TER, the display device DD may not operate normally.

Hereinafter, the error range TER is defined as a predetermined temperature range TER. The temperature range TER may be set as the reference temperature values RF measured with respect to the plurality of display panels DP in a process stage. For example, the temperature range TER during the normal operation may be determined by determining whether the display device DD operates normally based on the reference temperature values RF measured with respect to the plurality of display panels DP.

The temperature range TER may be calculated by the first sensing current values Is1 sensed from the plurality of display panels DP. Accordingly, the temperature range TER may be defined as a range of the first sensing current value Is1 corresponding to the normal operating range.

The temperature range TER may be stored in the comparison value storage part STO. For example, the maximum value Rmax and the minimum value Rmin of the temperature range TER may be stored in the comparison value storage part STO. The maximum value Rmax and the minimum value Rmin of the temperature range TER may be the maximum value and the minimum value of the first sensing current value Is1 in the normal operating range, respectively. Accordingly, in FIG. 10, the maximum value Rmax and the minimum value Rmin are illustrated in a vertical axis representing a current 'I'.

The temperature abnormality detection part TAD may determine whether the reference temperature value RF is normal using the maximum value Rmax and the minimum value Rmin. When the reference temperature value RF has a value greater than the maximum value Rmax and less than the minimum value Rmin, the temperature abnormality detection part TAD may determine the reference temperature value RF as abnormal 'N'.

When the reference temperature value RF is abnormal, the temperature abnormality detection part TAD may output a warning flag signal WF as '1'. In this case, a repair process in which the reference temperature value RF of the display panel DP is calculated again may be performed. That is, the reference temperature value RF may be modified and stored again in the temperature calculator TM.

When the reference temperature value RF is less than or equal to the maximum value Rmax and is greater than or equal to the minimum value Rmin, the temperature abnormality detection part TAD may determine that the reference temperature value RF is normal 'Y'. When the reference temperature value RF is normal, the temperature abnormality detection part TAD may output the warning flag signal WF as '0'.

Additionally, the temperature abnormality detection part TAD may determine whether the reference temperature value RF is normal by using the temperature value TEM measured by the temperature sensor TS. The temperature abnormality detection part TAD may determine whether the reference temperature value RF is normal by comparing the difference value between the temperature value TEM and the reference temperature value RF with a threshold value TH.

The temperature value TEM may be a value obtained by measuring the temperature of the display panel DP driven in the black mode. The temperature value TEM may correspond to an normal reference temperature value. When the temperature value TEM is represented as a value corresponding to the current 'I', for example, the temperature value TEM in FIG. 10 may be an intermediate value between the maximum value Rmax and the minimum value Rmin.

In an embodiment of the present disclosure, the threshold value may be defined as a difference value between the temperature value TEM and the maximum value Rmax or a difference value between the temperature value TEM and the minimum value Rmin.

When a difference value DF1 between the temperature value TEM and the reference temperature value RF is greater than the threshold value TH, the temperature abnormality detection part TAD may determine that the reference temperature value RF is abnormal 'N'. When a difference value DF2 between the temperature value TEM and the reference temperature value RF is less than or equal to the threshold value TH, the temperature abnormality detection part TAD may determine that the reference temperature value RF is normal 'Y'.

In an embodiment of the present disclosure, it may be determined whether the reference temperature value RF is normal by using only the maximum value Rmax and the minimum value Rmin. In addition, only the temperature value TEM sensed by the temperature sensor TS may be used to determine whether the reference temperature value RF is normal. In addition, the temperature value TEM, the maximum value Rmax, and the minimum value Rmin are used together to determine whether the reference temperature value RF is normal.

Figure 11:
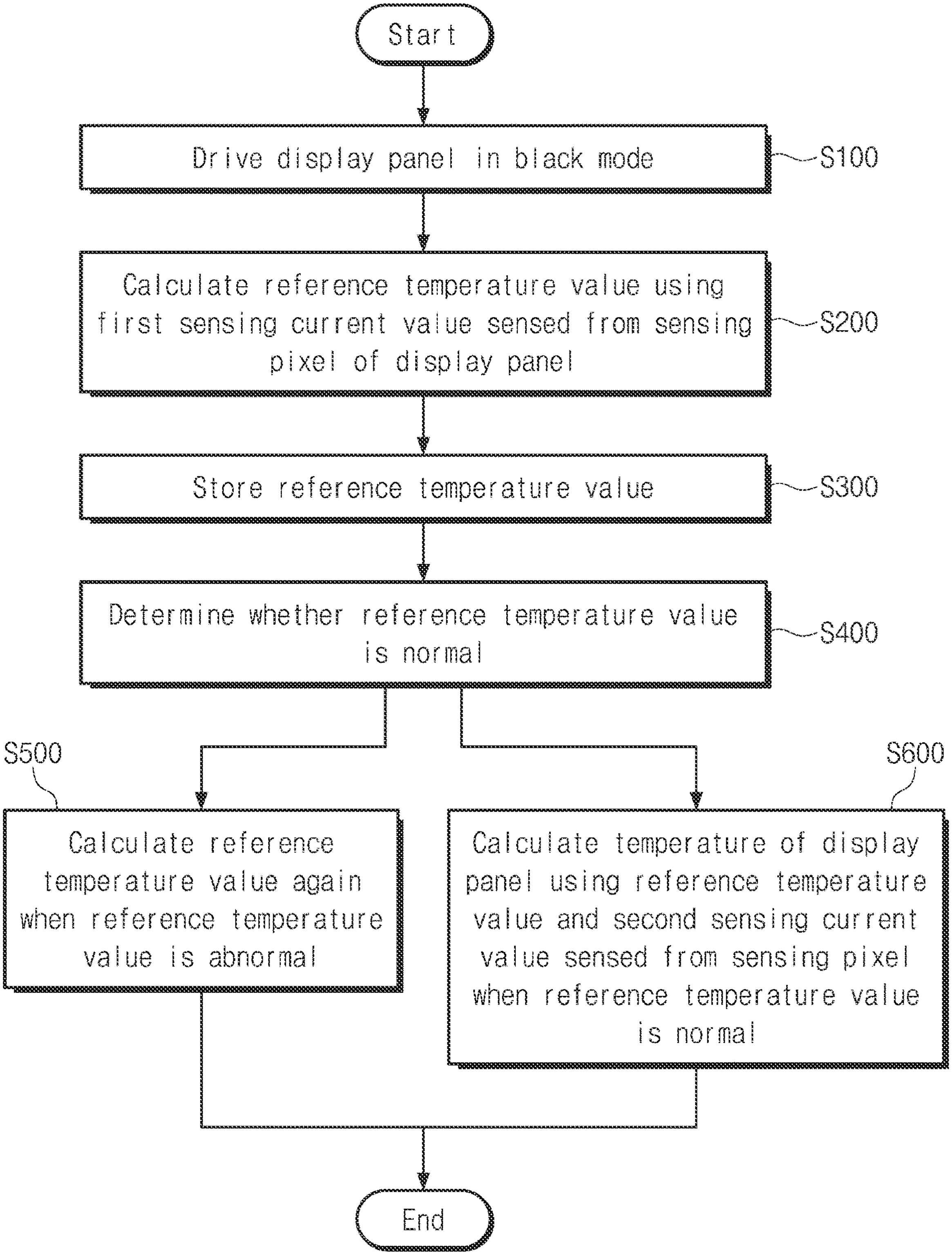
FIG. 11 is a flowchart for describing a method of driving a display device, according to an embodiment of the present disclosure.

FIG. 11 is a flowchart for describing a method of driving a display device, according to an embodiment of the present disclosure.

Referring to FIG. 11, the display panel DP may be driven in a black mode in operation S100. In operation S200, the reference temperature value RF may be calculated using the first sensing current value Is1 sensed from the sensing pixel PXs of the display panel DP. In operation S300, the reference temperature value RF may be stored in the temperature calculator TM.

In operation S400, it may be determined whether the reference temperature value S400 is normal by the temperature abnormality detection part TAD. In operation S500, when the reference temperature value RF is abnormal, the reference temperature value RF may be calculated again.

In operation S600, when the reference temperature value RF is normal, the display panel DP may be driven in the display mode and the temperature calculator TM may calculate the temperature of the display panel DP using the reference temperature value RF and the second sensing current value Is2 sensed from the sensing pixel PXs. For example, the second sensing current value Is2 is sensed from the sensing pixel PXs, and the temperature calculator TM may calculate the temperature of the display panel DP using a difference value between the second sensing current value Is2 and the first sensing current value Is1.

Figure 12:
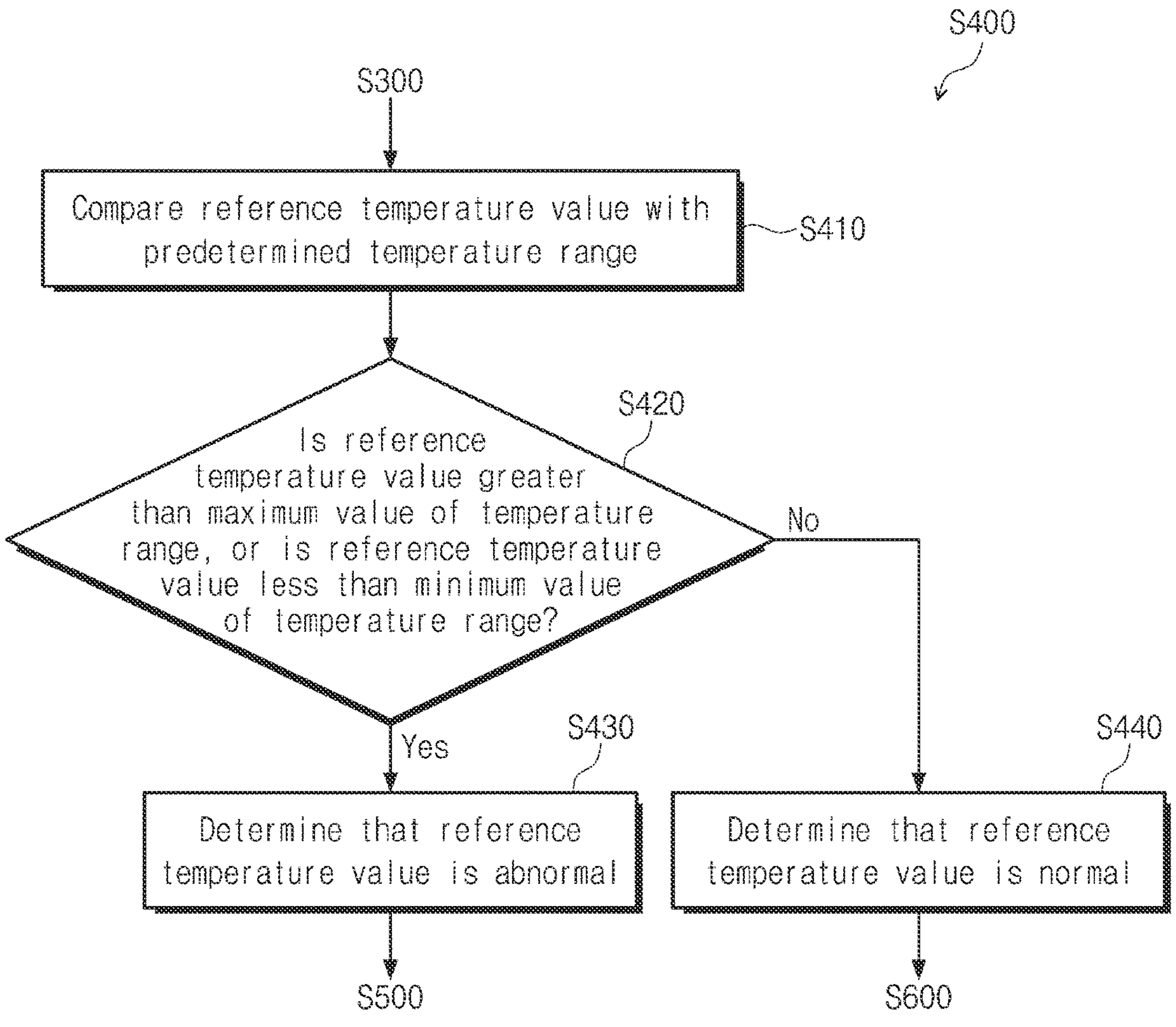
FIG. 12 is a flowchart illustrating an operation of determining whether a reference temperature value illustrated in FIG. 11 is normal through a method using a maximum value and a minimum value.
Figure 13:
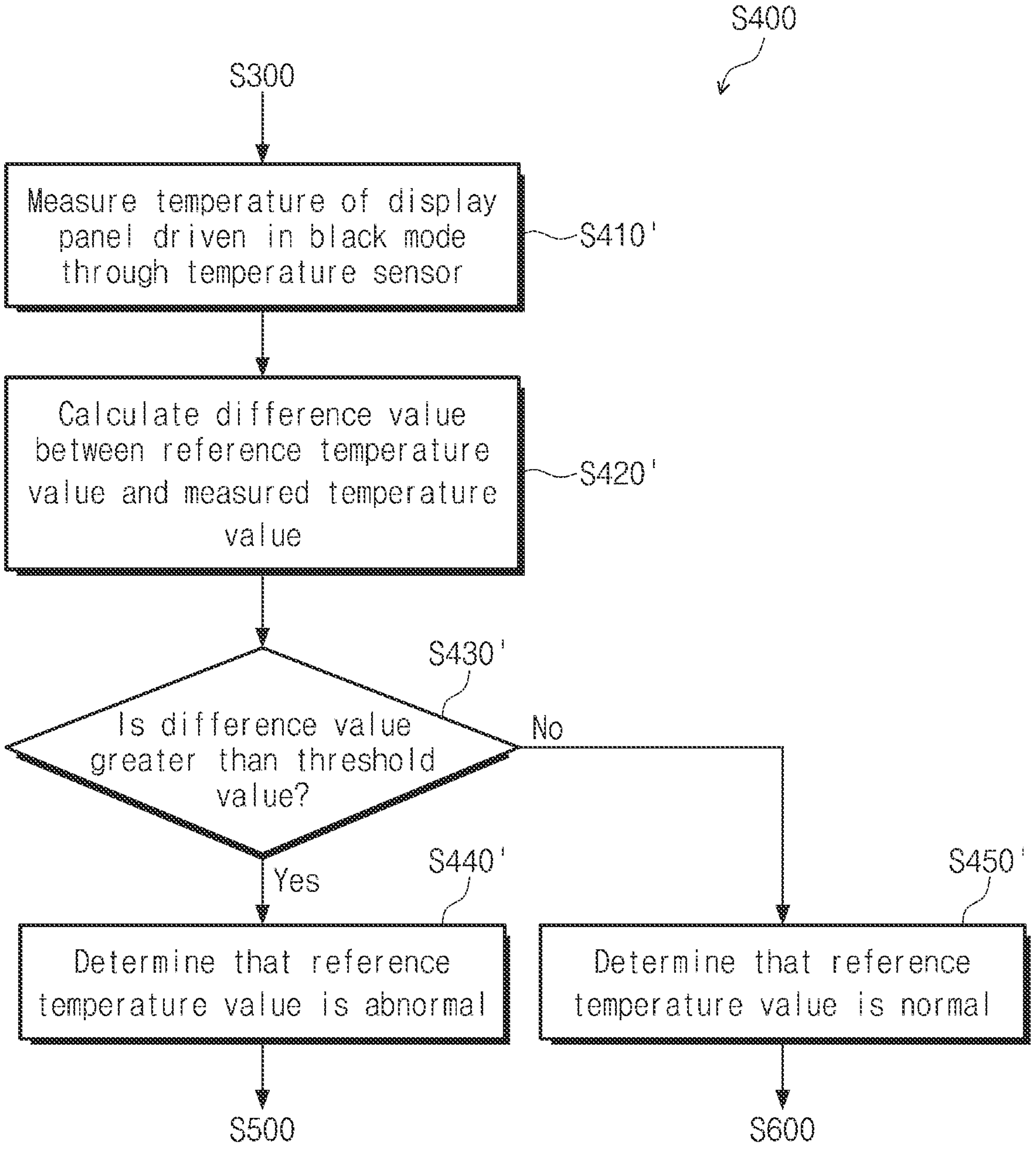
FIG. 13 is a flowchart illustrating an operation of determining whether a reference temperature value illustrated in FIG. 11 is normal through a method using a temperature value.

FIG. 12 is a flowchart illustrating an operation of determining whether a reference temperature value illustrated in FIG. 11 is normal through a method using a maximum value and a minimum value. FIG. 13 is a flowchart illustrating an operation of determining whether a reference temperature value illustrated in FIG. 11 is normal through a method using a temperature value.

Referring to FIG. 12, when it is determined whether the reference temperature value RF is normal by using the maximum value Rmax and the minimum value Rmin, operation S400 may include following operations S410, S420, S430, and S440.

In operation S410, the reference temperature value RF may be compared with the predetermined temperature range TER by the temperature abnormality detection part TAD. When the reference temperature value RF is greater than the maximum value Rmax of the temperature range TER or is less than the minimum value Rmin of the temperature range TER in operation S420, it may be determined that the reference temperature value RF is abnormal in operation S430. When the reference temperature value RF is less than or equal to the maximum value Rmax and greater than or equal to the minimum value Rmin in operation S420, it may be determined that the reference temperature value RF is normal in operation S440.

Referring to FIG. 13, when the temperature value TEM is used to determine whether the reference temperature value RF is normal, operation S400 may include following operations S410', S420', S430', S440', and 450'.

In operation S410', the temperature of the display panel DP driven in the black mode may be measured through the temperature sensor TS. In operation S420', a difference value between the reference temperature value RF and the measured temperature value TEM may be calculated.

When the difference value is greater than the threshold value TH in operation S430', it may be determined that the reference temperature value RF is abnormal in operation S440'. When the difference value is less than or equal to the threshold value TH in operation S430', it may be determined that the reference temperature value RF is normal in operation S450'.

According to an embodiment of the present disclosure, it may be determined whether the reference temperature value is normal by comparing a reference temperature value with a predetermined temperature range, or it may be determined whether the reference temperature value is normal by comparing a difference value between the reference temperature value and a temperature value measured by a temperature sensor with a threshold value.

Although an embodiment of the present disclosure has been described for illustrative purposes, those skilled in the art will appreciate that various modifications, and substitutions are possible, without departing from the scope and spirit of the disclosure as disclosed in the accompanying claims. In addition, the embodiments disclosed in the present disclosure are not intended to limit the technical spirit of the present disclosure, and all technical ideas within the scope of the following claims and their equivalents should be construed as being included in the scope of the present disclosure.

What is claimed is:

1. A display device comprising:

a display panel including a plurality of pixels;

a printed circuit board connected to the display panel;

a temperature sensor disposed on the printed circuit board;

a flexible circuit board configured to connect the display panel to the printed circuit board;

a data driver disposed on the flexible circuit board; and a temperature sensing part disposed on the printed circuit board, wherein the flexible circuit board is bent such that the printed circuit board is disposed under the display panel, the temperature sensor senses a temperature of the display panel, and the temperature sensor is disposed adjacent to a sensing pixel configured to output a sensing current among the pixels, wherein the temperature sensing part is configured to calculate a temperature of the display panel using the sensing current, wherein the temperature sensing part includes:

a temperature calculator configured to store a reference temperature value of the display panel that is calculated by a first sensing current value sensed from the sensing pixel when the display panel is driven in a black mode; and a temperature abnormality detection part configured to receive the reference temperature value and to determine whether the reference temperature value is normal, wherein a second sensing current value is sensed from the sensing pixel when the display panel is driven in a display mode, and wherein the temperature calculator is configured to calculate the temperature of the display panel by using a difference value between the second sensing current value and the first sensing current value corresponding to the reference temperature value.

2. The display device of claim 1, wherein the sensing pixel is disposed adjacent to a side of the display panel to which the flexible circuit board is connected.

3. The display device of claim 2, wherein the sensing pixel overlaps the temperature sensor in a plan view.

4. The display device of claim 1, wherein the temperature abnormality detection part determines whether the reference temperature value is normal by comparing the reference temperature value with a maximum value and a minimum value of a predetermined temperature range.

5. The display device of claim 4, wherein the temperature abnormality detection part determines the reference temperature value as abnormal when the reference temperature value is greater than the maximum value and is less than the minimum value.

6. The display device of claim 4, wherein the temperature abnormality detection part determines the reference temperature value as normal when the reference temperature value is less than or equal to the maximum value and is greater than or equal to the minimum value.

7. The display device of claim 1, wherein the temperature abnormality detection part determines whether the reference temperature value is normal by comparing a difference value between a temperature value measured by the temperature sensor and the reference temperature value with a threshold value when the display panel is driven in the black mode.

8. The display device of claim 7, wherein the temperature abnormality detection part determines the reference temperature value is abnormal when the difference value is greater than the threshold value.

9. The display device of claim 7, wherein the temperature abnormality detection part determines the reference temperature value as normal when the difference value is less than or equal to the threshold value.

* * * * *